(12) United States Patent
Kale et al.

(10) Patent No.: US 8,077,954 B2
(45) Date of Patent: Dec. 13, 2011

(54) SYSTEM AND METHOD FOR IMAGE PROCESSING

(75) Inventors: Amit Kale, Bangalore (IN); Manivannan Sundarapandian, Bangalore (IN)

(73) Assignee: Siemens Aktiengesellschaft, Munich (DE)

(*) Notice: Subject to any disclaimer, the term of this patent is extended or adjusted under 35 U.S.C. 154(b) by 761 days.

(21) Appl. No.: 12/185,245

(22) Filed: Aug. 4, 2008

(65) Prior Publication Data

US 2010/0027862 A1  Feb. 4, 2010

(51) Int. Cl.
*G06K 9/00* (2006.01)
(52) U.S. Cl. .................................................. 382/131
(58) Field of Classification Search .............. 382/128, 382/131
See application file for complete search history.

(56) References Cited

U.S. PATENT DOCUMENTS

| | | | | |
|---|---|---|---|---|
| 6,301,498 | B1* | 10/2001 | Greenberg et al. | 600/425 |
| 7,970,187 | B2* | 6/2011 | Puts et al. | 382/128 |
| 2007/0031019 | A1* | 2/2007 | Lesage et al. | 382/131 |
| 2007/0116342 | A1* | 5/2007 | Zarkh et al. | 382/130 |

OTHER PUBLICATIONS

Chan et al.; "Active Contours Without Edges", IEEE Transactions on Image Processing, Feb. 2001, pp. 266-277; vol. 10; No. 2.

* cited by examiner

*Primary Examiner* — Clayton E LaBalle
*Assistant Examiner* — Noam Reisner

(57) ABSTRACT

The present invention relates to a system and a method for processing an initial image of coronary arteries. In accordance with the proposed method, a healthy region and a stenosed region of said arteries are first demarcated in the initial image. A first intermediate image is obtained by generating a contour of said healthy region of said arteries by segmentation of said healthy region using a level set function. A second intermediate image obtained by performing edge detection on said stenosed region. The first and second intermediate images are then combined to obtain a composite image of a single connected component represented by a plane curve on said composite image.

11 Claims, 4 Drawing Sheets

SYSTEM AND METHOD FOR IMAGE PROCESSING

FIELD OF INVENTION

The present invention relates to image processing, and in particular, to processing of angiographic images.

BACKGROUND OF INVENTION

A major cause of coronary artery disease (CAD) is atherosclerosis, which is the thickening of the intima of the medium-sized arteries and consequent narrowing of the artery due to lipid and fibrous tissue deposition. This narrowing of a coronary artery is called stenosis. In order to determine the presence and extent of obstructive CAD when diagnosis is uncertain and CAD cannot be reasonably excluded by non-invasive testing, coronary angiography (angiographic imaging of coronary arteries) is required.

Angiographic imaging of coronary arteries involves introducing a radio-opaque substance into one or more coronary arteries. An x-ray source is directed toward the heart of the patient. An x-ray recorder, such as x-ray film, or x-ray camera, located behind the heart of the patient, records a two-dimensional image of the coronary arteries from a given perspective. Two-dimensional images from different perspectives are then reconstructed to obtain a three-dimensional image of a region of interest.

Coronary angiography is used for assessing the feasibility and appropriateness of various forms of therapy, such as revascularization by percutaneous or surgical intervention. For this purpose, it is necessary to accurately compute the width of stenosed arteries in the heart. To that end, effective image processing techniques for segmentation of arteries are required.

A known technique for image segmentation involves the use of level set functions for curve evolution. For example, the article T. Chan and L. Vese, "Active Contours without Edges" IEEE Trans. Image Processing, Vol. 10, no. 2, pp 266-277, February. 2001, proposes a model for active contours to detect objects in a given image based on the technique of curve evolution using a level set function. Level set methods work very well when there exist homogeneous regions of reasonably large spatial extent. However, in the case of stenosed regions in angiogram images, there is some mixing of the intensity values corresponding to interior and exterior of the arteries. As a result, most often, the stenosed region is simply not identified using level set methods.

Accordingly, there is a need for a robust technique for processing of angiographic images for segmentation of coronary arteries.

SUMMARY OF INVENTION

The present invention provides a solution to the aforementioned problems by performing level set based segmentation on the region excluding the stenosed region and edge detection on the stenosed region. Briefly, in accordance with one embodiment of the present invention, a method for processing an initial image of coronary arteries comprises demarcating, in said initial image, healthy and stenosed regions of said arteries. The method proceeds by obtaining a first intermediate image by generating a contour of said healthy region of said arteries by segmentation of said healthy region using a level set function. The method further includes obtaining a second intermediate image by performing edge detection on said stenosed region. Subsequently, the method comprises combining the first and second intermediate images to obtain a composite image of a single connected component represented by a plane curve on said composite image.

In accordance with another aspect of the present invention a system is proposed for processing an initial image of coronary arteries. The proposed system has means for demarcating, in said initial image, healthy and stenosed regions of said arteries. The proposed system includes means for obtaining a first intermediate image by generating a contour of said healthy region of said arteries by segmentation of said healthy region using a level set function. The proposed system also includes means for obtaining a second intermediate image by performing edge detection on said stenosed region. The proposed system is farther provided with means for combining the first and second intermediate images to obtain a composite image of a single connected component represented by a plane curve on said composite image.

BRIEF DESCRIPTION OF THE DRAWINGS

The present invention is further described hereinafter with reference to exemplary embodiments shown in the accompanying drawings, in which.

DETAILED DESCRIPTION OF INVENTION

Embodiments of the present invention provide a novel image processing solution to determine the widths of the arteries in two-dimensional (2D) images more accurately than is afforded by current systems. Specifically the proposed approach involves the fusion of region based segmentation and edge detection to achieve robust and accurate solution. The results in 2D can be computed for multiple 2D slices taken with different orientation followed by a three-dimensional (3D) reconstruction of the artery. The position and width in the reconstructed 3D image can be used for computing the stent dimensions.

Figure 1:
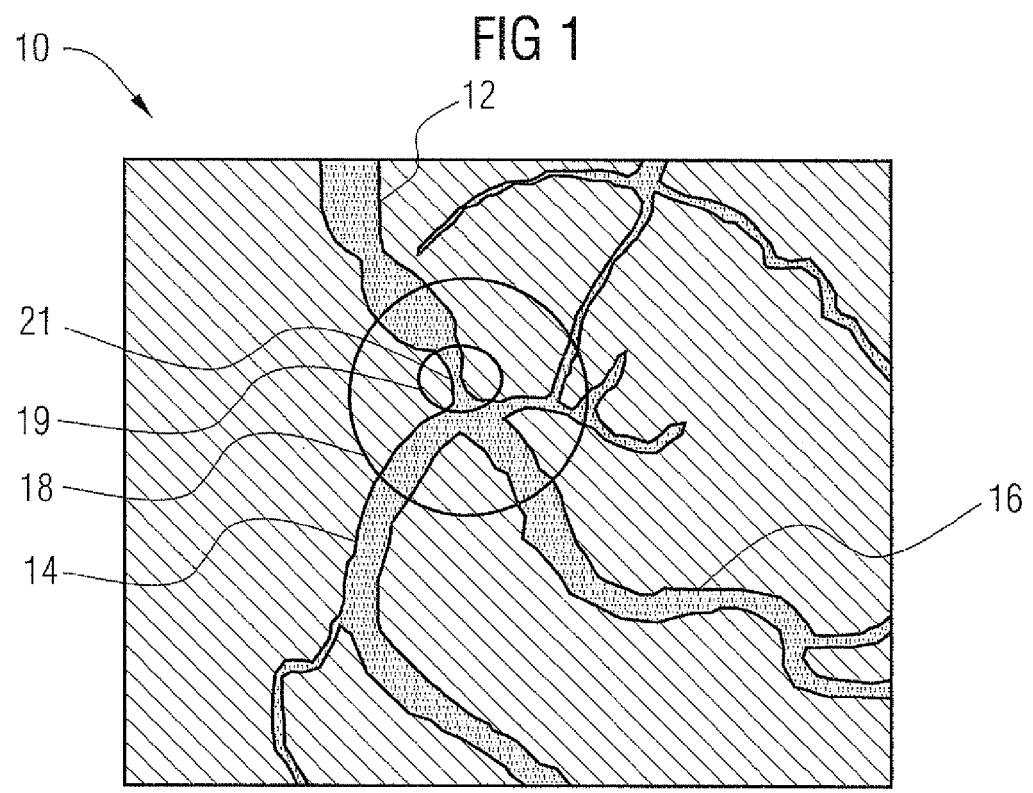
FIG. 1 is an exemplary angiogram image of coronary arteries indicating healthy and stenosed regions.

FIG. 1 shows an exemplary single 2D frame of an angiogram image 10 of coronary arteries. The image shows healthy regions comprising healthy arteries 12, 14 and 16. The image 10 also shows a stenosed region 21, which is the region with minimum lumen diameter (MLD). In the illustrated embodiment, the healthy and stenosed regions in the image 10 are demarcated by a user input. This input comprises drawing an outer first circle 18 (or any closed curve) and an inner second circle 19 (or any closed curve) on the image 10 by the user. The outer circle 18 is drawn such that it passes over at least a portion of the healthy region (i.e. over the healthy arteries 12, 14 and 16 in this example) and also encloses the stenosed region 21. The inner circle 19 is drawn so as to enclose only the stenosed region 21 as snugly as possible. As described hereinafter, using the above inputs, the proposed technique provides an output comprising segmentation of the arteries along with the cross-sectional width of each artery at both the healthy and stenosed regions. As used herein, the term 'segmentation' refers to the process of partitioning a digital image into multiple regions with an objective of simplifying the representation of that image into something that is meaningful or easier to analyze.

Having received the user input, the intensity values on the points on the outer circle 18 points are plotted as a function of the polar angle. Points of low intensity values (i.e., lower than a threshold value) along the outer circle 18 are identified as those belonging to the healthy region 12, 14 or 16. Segments of healthy arteries are identified by identifying contiguous points having low intensity values. In an exemplary embodiment, segments of healthy arteries with widths above a particular threshold are picked and the "P", "D" and "B" points (commonly referred as proximal, distal main branch point and distal side branch point respectively) are marked at the center of these segments automatically.

Figure 2:
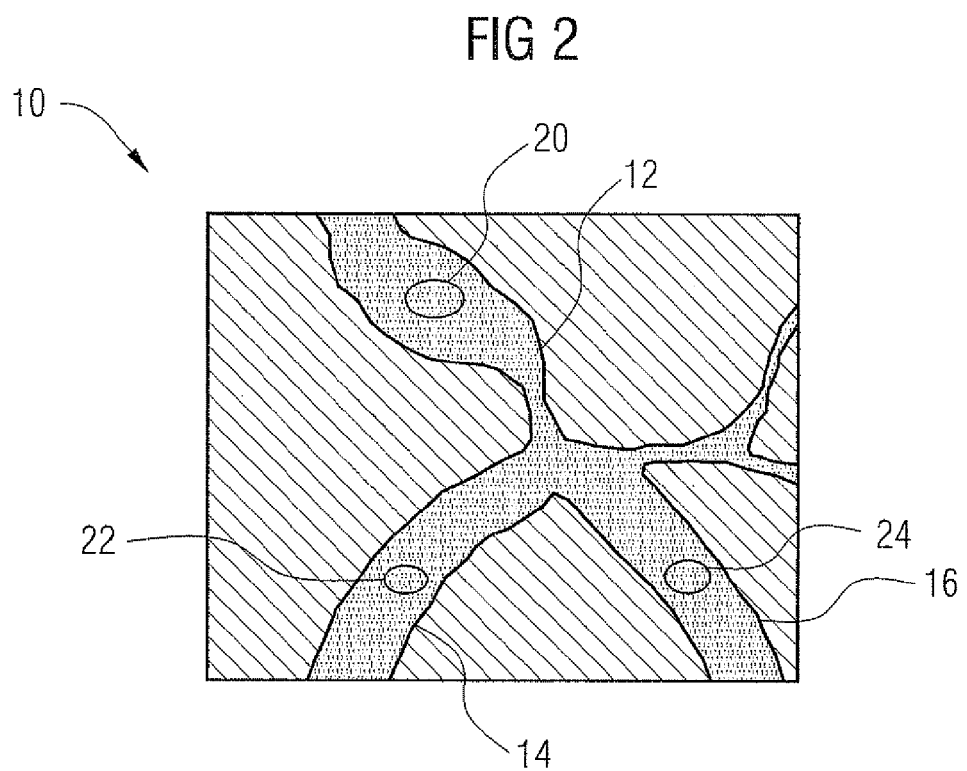
FIG. 2 illustrates circles drawn on the identified healthy region of the angiogram image whose signed distance transform is used to initialize the level set function.
Figure 3:
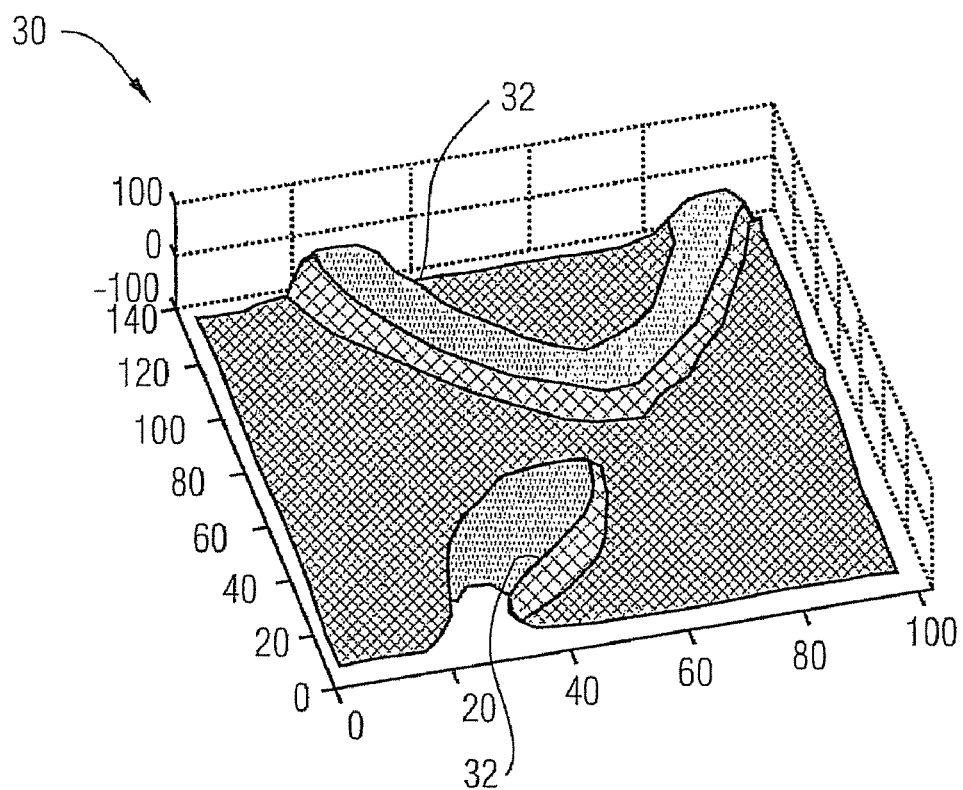
FIG. 3 illustrates an exemplary contour of the healthy region generated by evolution of the level set function.

Referring to FIG. 2, having identified said segments of the healthy region, the proposed method proceeds by drawing circles 20, 22 and 24 with centers corresponding to the centers of these segments and radii chosen such that the circles 20, 22 and 24 lie entirely inside the segments of healthy arteries. The signed distance transform of these circles is then computed. This involves, for each point in the image 10, computing the closest distance of that point from any of the circles 20, 22, 24 and assigning a sign to the computed distance based on whether or not the point is inside any of the circles. Typically, a negative sign is applied to the distance values of all points outside the circles 20, 22, 24 and a positive sign is applied to the distance values of all points that are inside any of the circles 20, 22, 24. The signed distance transform of the circles 20, 22 and 24 thus computed is used to initialize a level set function. The level set function is evolved in pseudo time using a partial differential equation. An example of such a partial differential equation is the Euler Lagrange equation corresponding to an energy minimization problem noted in the article T. Chan and L. Vese, "Active Contours without Edges" IEEE Trans. Image Processing, Vol. 10, no. 2, pp 266-277, Febuary 2001. In the illustrated embodiment, the partial differential equation is evolved for approximately one thousand iterations and appropriate re-initialization is applied to the level set function, for example, after every fifty iterations. The end result of the above process is a first intermediate image 30 as shown in FIG. 3. As illustrated herein, the end result after the iterations is an evolved level set function whose zero level set corresponds to a contour 32 of the arteries in the healthy region.

Figure 4:
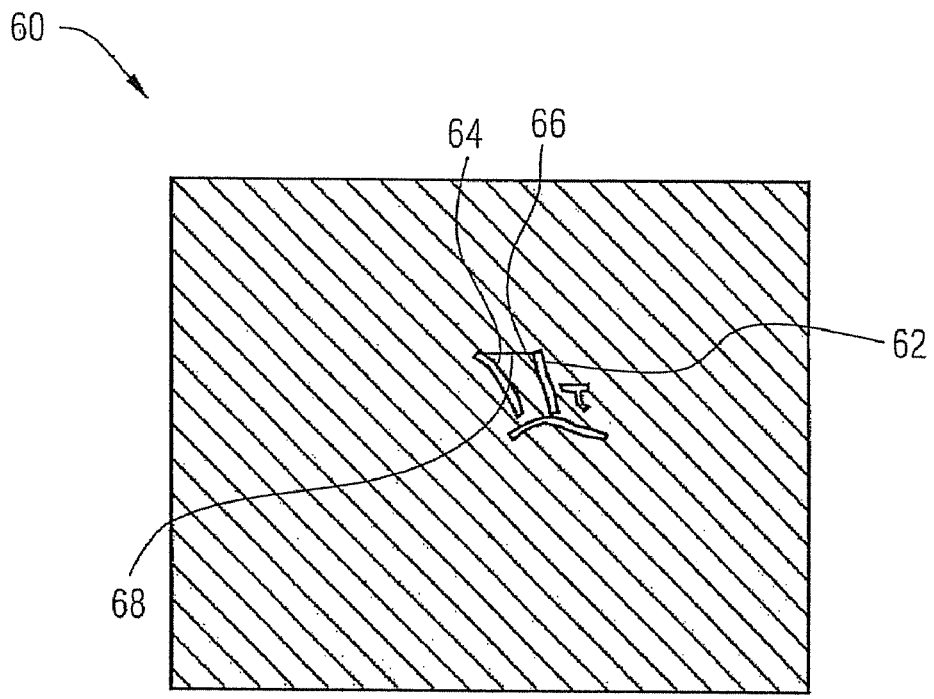
FIG. 4 illustrates an image of the stenosed region generated by edge detection.

The stenosed region 21 demarcated by the circle 19 drawn by the user is processed using an edge detection technique, such as by using Canny edge detection. Thus, as shown in FIG. 4, a second intermediate image 60 is generated comprising an edge map 62 of the stenosed region (region 21 in FIG. 1). The edge map is generated by assigning, for example a positive value to all points (pixels) in the image 60 that are detected as edge points (i.e., edge pixels), and a negative value to all other points. The edge points are identified with extremities of the artery in the stenosed region. The rows in the image 60 which have two positive values corresponding to the extremities of a valid artery (such as points 64 and 66) are identified and the line 68 between them is flood filled. Erosion may be applied to remove spurious regions in the image 60.

Figure 5:
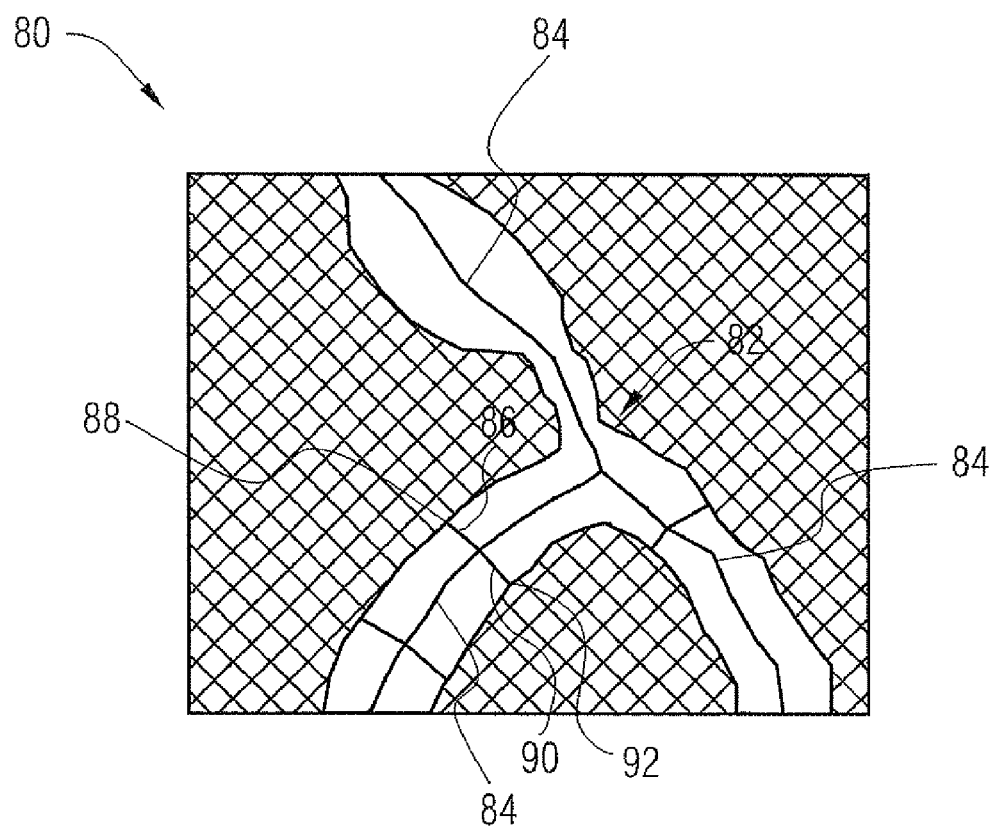
FIG. 5 illustrates a composite image having a single connected component.
Figure 6:
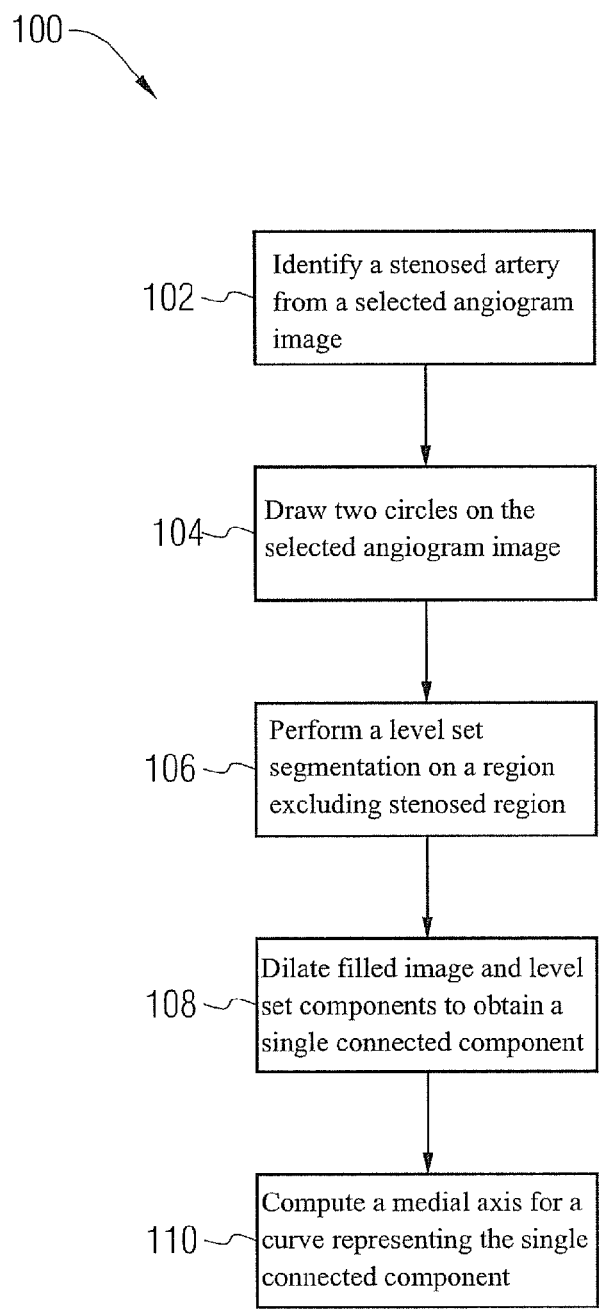
FIG. 6 is a flowchart illustrating an exemplary method for segmentation of arteries in accordance with one embodiment of the present invention.

The first intermediate image 30 obtained by level set segmentation of the healthy region is then combined with the second intermediate image 60 obtained by edge detection of the stenosed region by performing an OR operation of one with the other, to obtain a composite image 80 as shown in FIG. 5. Repeated dilation is then applied to obtain one single connected component represented by a 2D plane curve 82 on the composite image 80. A medial axis 84 is then computed for this single connected component. The medial axis 84 for the curve 82 is defined as the locus of the centers of circles that are tangent to curve 82 in two or more points, where all such circles are contained in the curve 82. In the illustrated embodiment in FIG. 5, polynomial fitting is applied to the three arms of the medial axis 84 in order to filter noise. Normals 86, 90 are then drawn along each point of the medial axis 84. The external intersection points 88, 92 of each of these normals 86, 90 with the curve 82 are then computed to give the widths across different cross-sections of the arteries represented by the single connected component. Such results in 2D can be computed for multiple 2D slices taken with different orientation followed by a three-dimensional (3D) reconstruction of the artery. The position and widths computed in the reconstructed 3D image can be used for determining the stent dimensions.

FIG. 8 is a flowchart illustrating an exemplary method 100 in accordance with the present invention. At block 102, the user selects a frame from a multi-frame angiogram image sequence to identify a stenosed artery. Next at block 104, the user draws two circles on the selected angiogram image. The first circle being for the complete region of interest, while the second circle enclosing just the region of stenosis. At block 106, level set segmentation is performed on the region excluding the stenosed region, while edge detection is carried out on the stenosed region, wherein edge point pairs are flood filled, followed by erosion to remove noise. Next, at block 108, dilation is applied to the composite of this filled image and level set components to obtain a single connected component, represented by a plane curve. Finally at block 110, a medial axis is computed for the curve representing the single connected component. Widths across the cross section of the arteries are then computed by drawing normals from different points on the medial axis and determining the external points of intersection of these normals with the curve.

The advantages of the present invention would be readily apparent to one skilled in the art. As mentioned above, it is not always possible to identify stenosed regions using level set methods, due to mixing of the intensity values corresponding to interior and exterior of the arteries in the stenosed region. On the other hand, edge detection based methods are more capable of detecting the artery boundaries in the stenosed region. However, the disadvantage of edge based methods is that they produce a large number of false positives which can distract the reconstruction. The present invention is thus advantageous in overcoming the limitations of level set based methods and edge detection methods in segmentation of angiogram images of coronary arteries, by demarcating healthy and stenosed regions in the angiogram image frame, and processing these regions separately, using different algorithms. The present invention is advantageous in providing better accuracy with regard to the width of the stenosed and healthy arteries.

Summarizing, the present invention relates to a system and a method for processing an initial image of coronary arteries. In accordance with the proposed method, healthy and stenosed regions of said arteries are first demarcated in the initial image. A first intermediate image is obtained by generating a contour of said healthy region of said arteries by segmentation of said healthy region using a level set function. A second intermediate image is obtained by performing edge detection on said stenosed region. The first and second intermediate images are then combined to obtain a composite image of a single connected component, represented by a plane curve on the composite image.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. Accordingly, it is intended that the invention be limited only by the spirit and scope of the appended claims.

The invention claimed is:

1. A method for processing an image of coronary arteries of a patient, comprising:
    demarcating a healthy region of the arteries and a stenosed region of the coronary arteries in the image;
    segmenting the healthy region of the coronary arteries using a level set function;
    generating a contour of the healthy region of the coronary arteries based on the segmentation;
    obtaining a first intermediate image from the contour of the healthy region of the coronary arteries;
    obtaining a second intermediate image by performing edge detection on the stenosed region; and
    combining the first intermediate image and the second intermediate image to obtain a composite image of a single connected component of the coronary arteries represented by a plane curve on the composite image.

2. The method as claimed in claim 1, wherein the healthy region is demarcated by drawing a first closed curve on the image enclosing at least a portion of the healthy region and the stenosed region.

3. The method as claimed in claim 2, wherein the stenosed region is demarcated by drawing a second closed curve on the image enclosing the stenosed region but excluding the healthy region.

4. The method as claimed in claim 3, wherein the first closed curve and the second closed curve are drawn by a user input.

5. The method as claimed in claim 4, wherein the healthy region is segmented by:
    identifying a segment of the healthy region by identifying contiguous points on the first closed curve whose intensity values are lower than a threshold value;
    drawing a circle lying entirely within the segment for the identified segment; and
    computing a signed distance transform of the circle to initialize a level set function to generate the contour of the healthy region.

6. The method as claimed in claim 5, wherein the level set function is evolved in pseudo time using an Euler-Lagrange partial differential equation.

7. The method as claimed in claim 1, wherein the first and the second intermediate images are combined by applying repeated dilation of the first or the second intermediate image to obtain the single connected component on the composite image.

8. The method as claimed in claim 1, further comprising
    determining a medial axis of the plane curve representing the single connected component;
    drawing a plurality of normals from a plurality of points of the medial axis across different cross-sections of the single connected component; and
    determining external intersection points of the normals with the plane curve to compute widths of the single connected component across the different cross-sections.

9. A system for processing an image of coronary arteries of a patient, comprising:
    a device that:
        demarcates a healthy region of the arteries and a stenosed region of the coronary arteries in the image,
        segments the healthy region of the coronary arteries using a level set function,
        generates a contour of the healthy region of the coronary arteries based on the segmentation,
        obtains a first intermediate image from the contour of the healthy region of the coronary arteries,
        obtains a second intermediate image by performing edge detection on the stenosed region, and
        combines the first intermediate image and the second intermediate image to obtain a composite image of a single connected component of the coronary arteries represented by a plane curve on the composite image.

10. A non-transitory computer-readable medium storing an executable code executed on a computer for processing an image of coronary arteries of a patient, comprising: a computer readable program code for: segmenting a healthy region of the coronary arteries using a level set function, generating a contour of the healthy region of the coronary arteries based on the segmentation, obtaining a first intermediate image from the contour of the healthy region of the coronary arteries, obtaining a second intermediate image by performing an edge detection on a stenosed region of the coronary arteries, and combining the first intermediate image and the second intermediate image to obtain a composite image of a single connected component of the coronary arteries represented by a plane curve on the composite image.

11. The non-transitory computer-readable medium as claimed in claim 10, wherein the healthy region and the stenosed region of the coronary arteries are demarcated by a user input.

* * * * *